Figure 1:
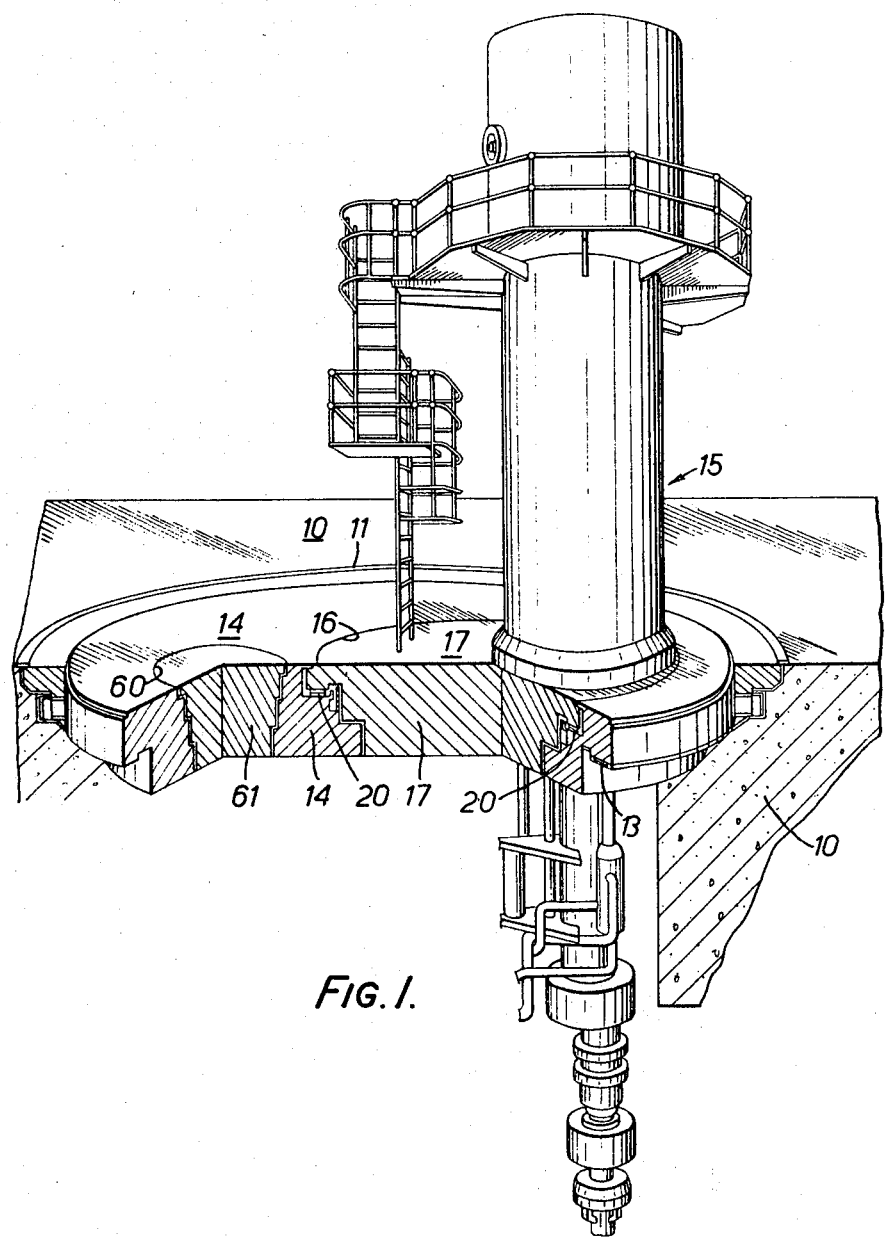

July 16, 1968  J. GREGSON  3,393,026
ROTARY BEARING ARRANGEMENTS FOR SUPPORTING LARGE HEAVY
OBJECTS, FOR EXAMPLE ROTATABLE SECTIONS
OF SHIELDING IN NUCLEAR REACTORS
Filed Nov. 23, 1964  5 Sheets-Sheet 1

FIG. I.

INVENTOR
JOHN GREGSON
By
Watson, Cole, Grindle & Watson
ATTORNEYS

July 16, 1968 J. GREGSON 3,393,026
ROTARY BEARING ARRANGEMENTS FOR SUPPORTING LARGE HEAVY
OBJECTS, FOR EXAMPLE ROTATABLE SECTIONS
OF SHIELDING IN NUCLEAR REACTORS
Filed Nov. 23, 1964 5 Sheets-Sheet 3

INVENTOR
JOHN GREGSON.
BY
Watson, Cole, Grindle + Watson
ATTORNEYS $$\text{3,393,026}$$

ROTARY BEARING ARRANGEMENTS FOR SUPPORTING LARGE HEAVY OBJECTS, FOR EXAMPLE ROTATABLE SECTIONS OF SHIELDING IN NUCLEAR REACTORS

John Gregson, Heston, England, assignor to Fairey Engineering Limited, Heston, England, a company of Great Britain Filed Nov. 23, 1964, Ser. No. 413,150
Claims priority, application Great Britain, Nov. 22, 1963, 46,314/63
5 Claims. (Cl. 308—160)

This invention relates to a rotary bearing arrangement used to support a large, heavy object which is required to rotate about a vertical axis. The invention is particularly applicable to the bearing for a rotary section of concrete or other shielding of a nuclear reactor, although it may also be employed in connection with other heavy objects which may be required to rotate, for example the bearings of a swing bridge.

According to one aspect of the present invention, a bearing arrangement for a heavy object comprises a pair of co-operating bearing plates or rings respectively affording upwardly-facing and downwardly-facing co-operating annular, circular or frusto-conical bearing surfaces, the said bearing surfaces being coaxial surfaces of revolution between which a film of high-pressure hydraulic fluid is maintained, at least one of the bearing surfaces being formed with a series of spaced pockets or recesses distributed over its surface, which recesses are connected individually or in groups through separate throttling restrictors to a source of high-pressure hydraulic fluid whereby the film of fluid flows continuously between the bearing surfaces from the recesses to low-pressure discharge regions constituted for example by the edges of the bearing surfaces, the hydrostatic pressure of the fluid film supporting at least a part of the bearing load and maintaining the space between the bearing surfaces filled with hydraulic fluid.

Preferably one or each of the bearing members, conveniently that associated with the lower bearing surface, is backed by a resilient pad or a series of spaced resilient pads enabling it to yield slightly locally under the applied load, and to accommodate manufacturing inaccuracies.

Thus in cases where the object being supported is so large and heavy that it sags slightly under its own weight, the incorporation of the resilient pad in the bearing arrangement enables one or both of the bearing plates to yield slightly so as to follow and accommodate the sagging of the load without setting up excessive local stresses. For example where the upper bearing plate is rigidly attached to the load and is distorted by the sagging of the load, the lower bearing plate being supported on its resilient pad or pads on a rigid bedplate is capable of yielding slightly under the bearing load to follow the distortion of the relatively-rotating upper bearing plate. Such local distortion is further accommodated by the hydraulic film maintained flowing between the two co-operating bearing surfaces, especially in cases where the whole of the bearing load is transmitted through the flowing film and where the film is relied on to keep the bearing surfaces from coming into contact.

Thus it will be understood that the total pressure drop from the source to the low-pressure discharge region will be shared between each throttling restrictor and the film section flowing from the associated pocket or pockets, in proportions which depend on the rate of flow of fluid. Suppose that the distance between the co-operating bearing surfaces increases momentarily in the vicinity of a pocket or group of pockets, so that the film thickness and hence the rate of fluid flow from the pocket or pockets is increased, the correspondingly increased rate of flow through the associated restrictor will increase the pressure drop across the restrictor, so that the pressure drop across the flowing film, from the pocket or pockets to the low-pressure discharge area, will be correspondingly decreased. This will decrease the mean hydrostatic pressure of the liquid constituting the film, and will decrease the total hydraulic thrust acting locally on the bearing surfaces to hold them apart, so that the bearing surfaces will tend to be moved towards one another under the applied load. Conversely, a local reduction in the separation between the opposed bearing surfaces will reduce the fluid flow and hence reduce the pressure drop across the associated restrictor. The proportion of the total pressure drop existing across the film will be correspondingly increased, and the resultant increase in hydrostatic thrust on the bearing surfaces will tend to separate them.

Thus the regulating effect of the throttling restrictors in series with the pockets tends to maintain the film thickness between the bearing surfaces at a constant value, any local increase or decrease in the separation of the bearing surfaces being automatically corrected by the resultant change in hydrostatic thrust acting on them. A "hydrostatic" bearing according to the invention, in which the pressurized fluid film is relied on entirely to support the massive bearing load, may be made extremely "stiff," to such an extent that actual physical contact between the opposed bearing surface due to breakdown of the fluid film is avoided under practically all circumstances.

As mentioned above, the "hydrostatic" bearing arrangement of the present invention, preferably incorporating its resilient pad to accommodate sagging of the load, is especially suitable for supporting a rotary section of the shielding of a nuclear reactor. Such a section of concrete shielding may weigh as much as 500 tons and when in the form of a disc 20 feet or more in diameter would be liable to appreciable sagging under its own weight.

Furthermore a rotatable section of shielding of a nuclear reactor is usually required to be sealed against the egress of gas from the interior of the shielding in which the reactor core is housed. For example the interior of the shielding may contain cooling gas contaminated with radioactive dust, and under fault conditions the cooling gas pressure may reach a substantial superatmospheric pressure, perhaps 15 p.s.i. gauge for a short time; and the gas sealing means must ensure that this gas does not escape past the bearing of the rotatable section.

The "hydrostatic" bearing arrangement of the present invention, in which the clearance between the opposed bearing surfaces is maintained filled with the film of flowing hydraulic liquid, serves admirably to constitute such a gas seal preventing the escape of gas between the bearing surfaces.

According to a further feature of the invention as applied to the bearing arrangement of a rotatable section of shielding of a nuclear reactor, the fixed lower bearing member is surrounded by a circumferential weir which traps a quantity of hydraulic fluid discharged from between the co-operating bearing surfaces and maintains a head of the trapped fluid in the space between the weir and the bearing above the level of the outer edges of the co-operating bearing surfaces. This head of trapped liquid augments the effectiveness of the gas seal provided by the pressurised fluid film flowing between the bearing surfaces, and acts as an emergency reservoir of sealing liquid which will prevent the escape of contaminated gas between the opposed bearing surfaces in the event of a failure of the supply of pressurised hydraulic fluid to the pockets or recesses of the bearing surface or surfaces. In normal operation excess hydraulic fluid discharged from between the bearing surfaces into the reservoir afforded within the weir will trickle over the top of the weir into a return channel through which it will flow under gravity back to the main supply.

In certain circumstances the bearing may incorporate a roller race constructed and arranged to support the major part of the load constituted by the rotatable section of shielding, instead of relying on the pressurised fluid film for that purpose, but nevertheless the pressurised fluid film is still relied on to provide, in conjunction with the surrounding weir, the gas seal for preventing the escape of gas under pressure through the bearing.

In one embodiment of the present invention in its application to the shielding of the nuclear reactor, the shielding defines an enclosure filled with cooling gas normally maintained under sub-atmospheric pressure and containing the reactor core, and the top wall of the enclosure includes a circular aperture closed by a rotatable circular disc-shaped cover section of shielding, which in turn is itself formed with an eccentric circular aperture closed by a second and smaller circular disc-shaped cover section of shielding which is independently-rotatable relatively to the first cover section and on which a fuel charging machine is eccentrically mounted, both the circular cover sections being supported wholly by means of the "hydrostatic" bearings of the present invention which also provide the necessary gas seals at the edges of the rotatable cover section.

Figure 2:
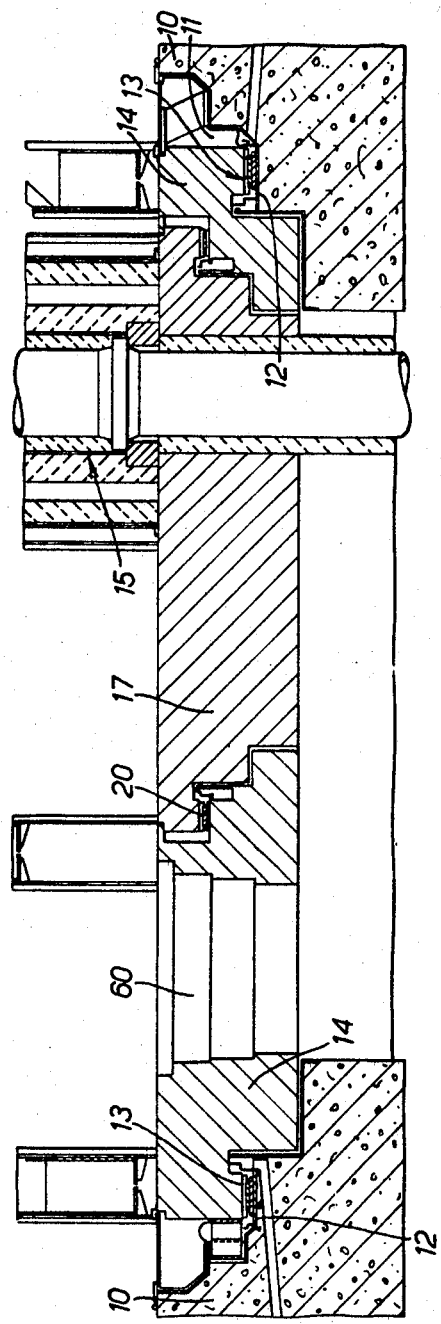

The invention may be carried into practice in various ways but one specific embodiment will now be described by way of example only with reference to the accompanying drawings, in which FIGURE 1 is a perspective view of part of the roof of the shielding of a nuclear reactor, showing the mounting of the refuelling machine for the reactor, FIGURE 2 is a sectional elevation of the main and auxiliary rotatable cover sections of the reactor shielding roof which rotatably support the fuelling machine.

Figure 3:
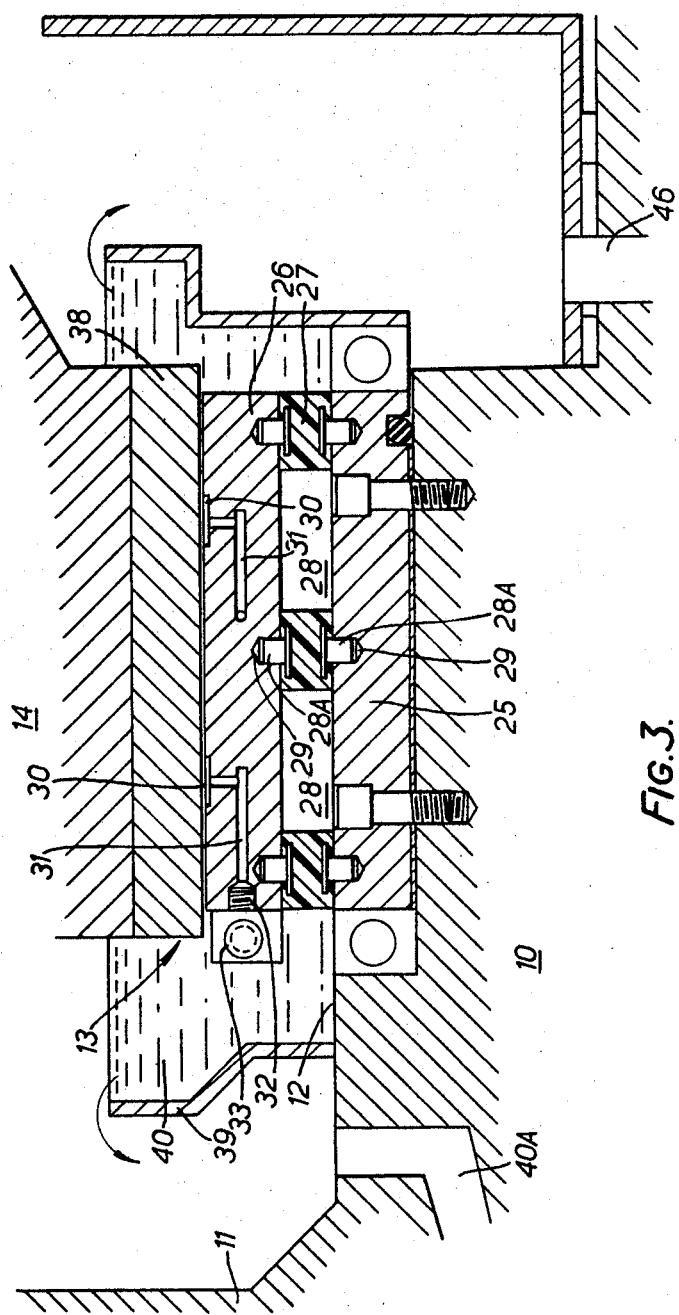
Figure 4:
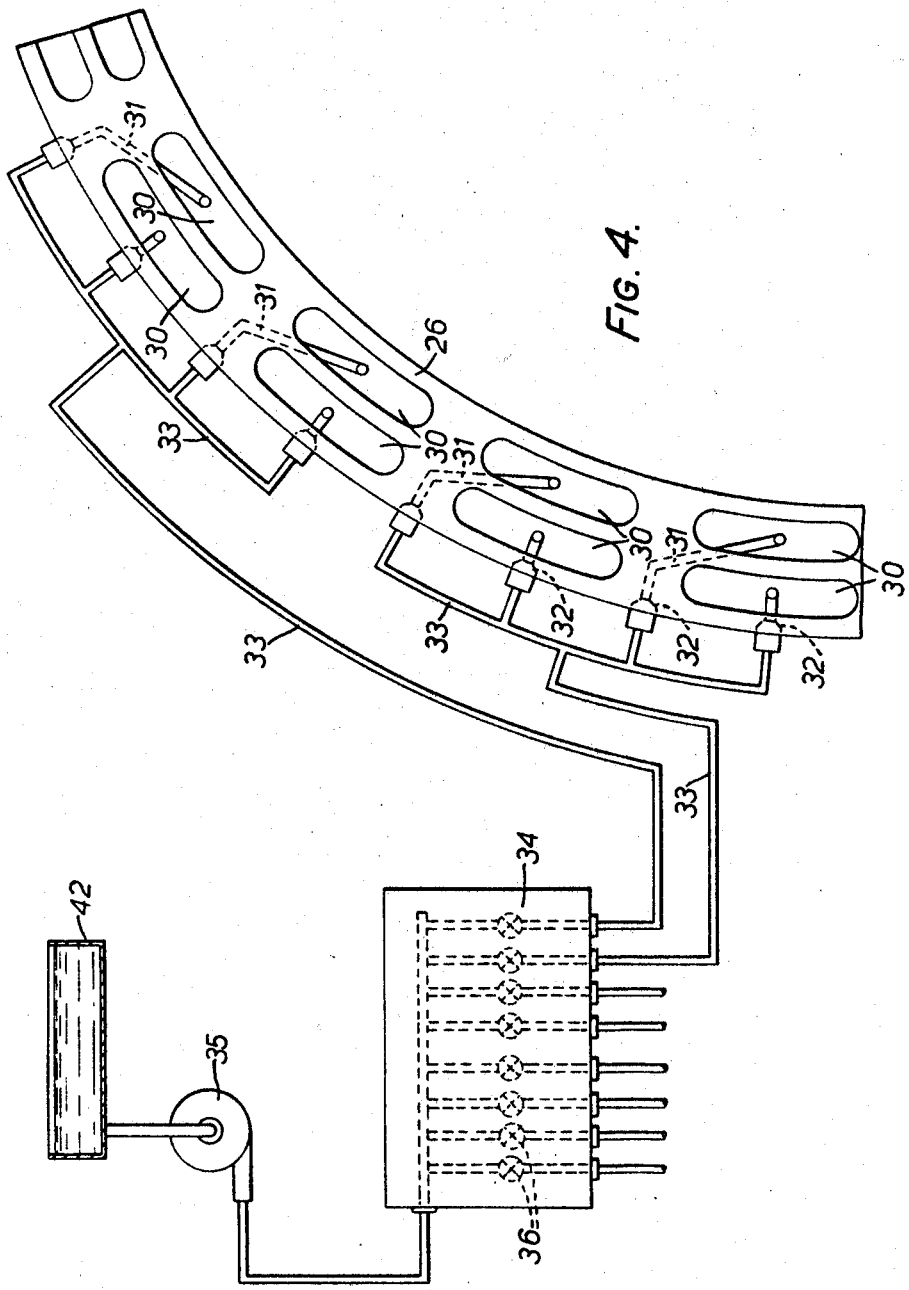
Figure 5:
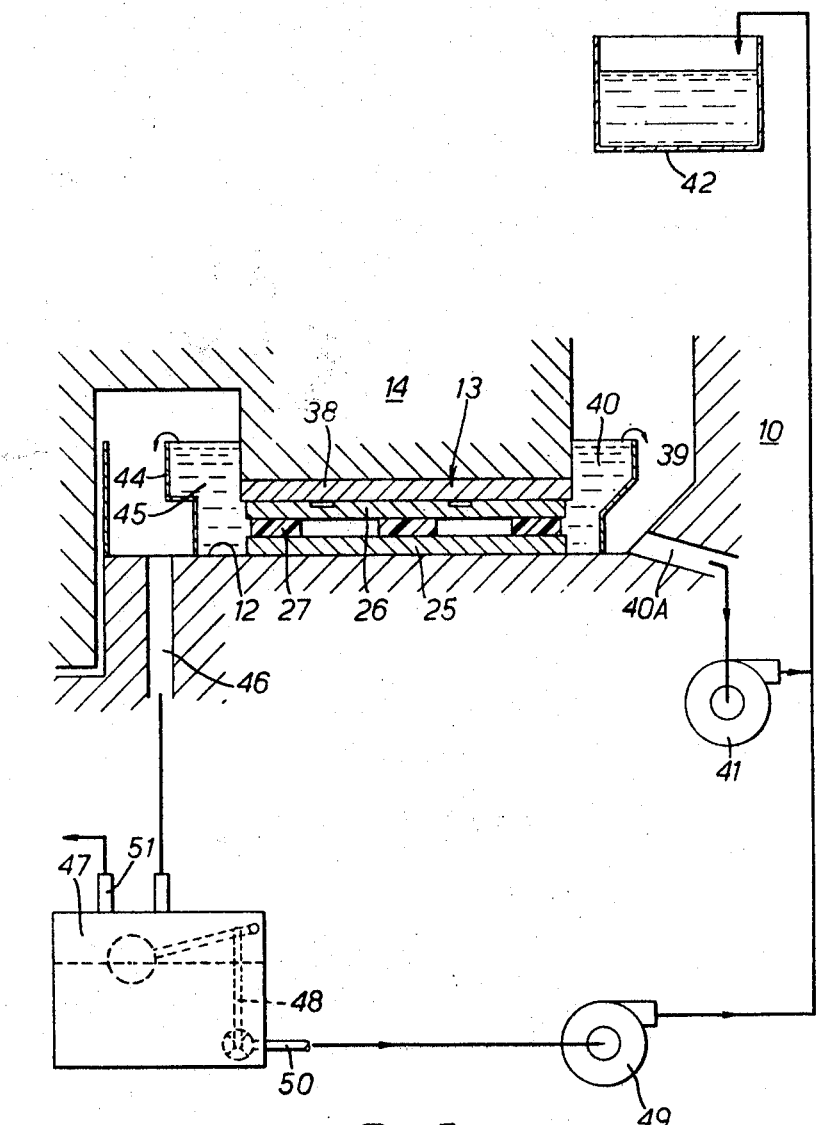

FIGURE 3 is an enlarged fragmentary sectional view of the hydrostatic bearing for the main rotatable cover section, FIGURE 4 is a fragmentary plan view showing part of the recessed surface of the lower bearing plate of the bearing of FIGURE 3, and FIGURE 5 is a diagrammatic view of the gas seal arrangements and of the fluid discharge arrangements for the bearing of FIGURES 3 and 4.

In the embodiment illustrated, the invention is applied to a nuclear reactor of the steam-generating heavy-water-moderated type whose core is housed within an enclosure formed by concrete shielding and normally filled with air and steam at a slight sub-atmospheric pressure which in the event of a fault can rise to a super-atmospheric pressure. The horizontal cover or roof 10 of the shielded enclosure is formed with a large circular aperture 11 about 25 feet in diameter, having an upwardly-facing circumferential step 12 formed around its rim to support the bearing 13 for the main rotatable cover section 14, which is a circular disc-shaped slab of concrete which carries the refuelling machine 15 and other parts. The total weight of the rotatable cover section 14 and the refuelling machine 15 and other parts is upwards of 500 tons. The main cover section 14 is provided with an eccentric circular aperture 16, also stepped around its rim, which is closed by a rotatable auxiliary cover section 17 on which the refuelling machine 15 is mounted. The machine 15 extends through a sealed eccentric aperture in the auxiliary cover 17 and reaches down to the level of the reactor standpipe deck (not shown) within the shielded enclosure below the cover 10, for co-operation with the selected standpipes. Thus by rotation of the main cover section 14 in the top wall 10, the refuelling machine 15 can be swung around in a wide arc to bring it generally over a particular section of the standpipe deck, after which the final positioning of the refuelling machine 15 to align it with a selected standpipe can be effected by rotating the auxiliary cover section 17, in which the machine 15 is eccentrically mounted, together with any fine angular adjustment of the main cover section 14 which may be required.

The bearings 13 of the main cover section 14 in the top wall 10 of the shielding, and the bearings 20 of the auxiliary cover section in the main cover section, are both of the "hydrostatic" kind referred to above, and the bearing 13 of the main cover section 14 will now be described with particular reference to FIGURES 3 to 5. A fixed annular steel bedplate 25 is bolted down onto the concrete step 12 of the rim of the shielding roof 10, and a lower annular steel, brass or bronze bearing plate 26 of the bearing 13 is positioned over this, an annular resilient pad 27 of polyurethane or other resilient synthetic material being interposed between the two plates 25 and 26. Apertures 28 are formed in the pad 27 and are distributed over the area of the pad to permit its local compression under applied loads, and the pad 27 is located by means of studs 28A which engage in dowel holes 29 formed in the two annular plates 25 and 26. The lower bearing plate 26 which rests on the resilient pad 27 is formed in its upwardly-facing bearing surface with a symmetrical pattern of shallow recesses 30 distributed over its area in spaced relationship, the recesses 30 being of circular, arcuate or other shape. The recesses 30 are indicated in FIGURE 4 as being arcuate, and are connected individually or in groups to internal passages 31 formed in the bearing plate 26 and leading to threaded sockets 32 at the edge of the annular plate 26, to which sockets are connected small-bore pressure pipes 33 leading to a separate restrictor block 34 of the construction forming the subject of British patent specification No. 46302/63 and 46364/63 (Case 631). In the restrictor block 34 each pressure line 33, and hence each surface recess 30 or group of recesses 30 of the bearing plate 26, is connected to a common source 35 of high-pressure hydraulic fluid through an individual throttling restrictor 36 of capillary rod construction by which the flow of pressure fluid to the associated recess or recesses is regulated. The restrictor block 34 is indicated diagrammatically in FIGURE 4.

The downwardly-facing bearing surface of an annular steel bearing plate 38 rigidly secured to the main cover section 14 is plane and unrecessed, and is supported by the upward thrust of the continuously-flowing film of pressurised hyraulic fluid which is caused to flow from the recesses 30 in the lower bearing plate 26 to the edges of the opposed surfaces of the bearing plates 26 and 38, from which it escapes. An outer weir 39 circumferentially surrounds the outer edges of the bearing plates 26 and 38 to define an annular reservoir 40 in which a supply of the hydraulic liquid is trapped and stands at a level above that of the co-operating bearing surfaces, to constitute a gas seal as already described. The excess fluid flows over the top of the weir 39 and trickles down to enter an inclined radial passage 40A formed in the stepped edge 12 of the roof 10 of the shielding enclosure, whence it is returned by a pump 41 to a centralised reservoir 42 for recirculation. An inner weir 44 extends internally around the inner edges of the annular bearing plates 26 and 38 to provide an inner annular reservoir 45 in which a supply of the hydraulic fluid discharged inwardly from the bearing 13 is trapped and stands at a level above that of the co-operating bearing surfaces. The excess fluid flows over the top of the weir 44 and trickles through a drain passage 46 into a float chamber 47 provided with a ball float valve 48 and is thence returned to the fluid reservoir 42 by a pump 49 as shown in FIGURE 5. The float valve 48 maintains a head of fluid in the valve chamber 47, the outlet 50 to the reservoir 42 being below the level of the fluid within the float chamber 47 so that a trap is formed which prevents the escape of contaminated air from the inner annular reservoir 45 via the drain passage 46. The upper part of the float chamber 47 is vented back to the space inside the reactor shielding by a vent pipe.

The fluid in the weirs serves a dual purpose. Not only will it maintain a gas seal in the event of pump failure, the seal persistence amounting in certain cases to several days, but also in the case of a large bearing when the bearing members are made up of several small segments joined together, the fluid in the weir serves to seal the joints between these separate parts of the bearing members, and obviates the necessity for making these joints fluid-tight.

The "hydrostatic" bearing 20 of the auxiliary cover section 17 which rotatably supports the section 17 in the main cover section 14, is similar to the main cover section bearing 13 described above, and will not be further described.

The main cover section is also formed with a smaller aperture 60 closed by a non-rotable circular cover 61, for access purposes.

What I claim as my invention and desire to secure by Letters Patent is:

1. A bearing arrangement for rotatably supporting a heavy object, which comprises a pair of cooperating bearing plates respectively affording upwardly-facing and downwardly-facing cooperating bearing surfaces which are coaxial surfaces of revolution, and between which a film of high-pressure hydraulic fluid is maintained, wherein at least one of the bearing plates is formed in its surface with a series of spaced recesses distributed over its surface area, which recesses are connected through throttling restrictors to a source of high-pressure hydraulic fluid, whereby a film of fluid flows continuously between the opposed bearing surfaces from the recesses to low-pressure discharge regions, the hydrostatic pressure of the fluid film supporting at least a part of the bearing load and maintaining the space between the bearing surfaces filled with hydraulic fluid, the said bearing arrangement being provided with an external circumferential weir surrounding the outer edges of the cooperating bearing surfaces, an internal circumferential weir surrounded by the inner edges of the cooperating bearing surfaces, the external and internal weirs trapping a quantity of hydraulic fluid discharged from between the cooperating bearing surfaces and each weir being high enough to maintain a head of trapped fluid in the space between itself and the bearing above the level of the edges of the cooperating bearing surfaces, and pump means for returning to a centralized reservoir hydraulic fluid discharged from between the cooperating bearing surfaces which overflows a said weir for recirculation through the hydraulic system.

2. A bearing arrangement as claimed in claim 1 in which one of the bearing members is backed by resilient pad means enabling the bearing to yield slightly locally under the applied load and to accommodate manufacturing inaccuracies of the bearing plates and their deformations under load.

3. A bearing arrangement as claimed in claim 2 in which the upper bearing plate is rigidly attached to a load-bearing member and is liable to distortion due to sagging of the load-bearing member, and in which a rigid bed plate is provided, the resilient pad means being interposed between the lower bearing plate and the rigid bed plate to support the lower bearing plate, the resilient pad means being capable of slight local yelding under the bearing load to accommodate distortion of the upper bearing plate during rotation thereof relatively to the lower bearing plate.

4. A bearing arrangement as claimed in claim 1 in which the whole of the bearing load is transmitted through the film of flowing liquid and is supported by the hydrostatic pressure of the said film, the said film preventing the bearing surfaces from coming itno contact with one another.

5. A bearing arrangement as claimed in claim 1 in which the recesses in the surface of the said bearing plate are arranged in a pattern of at least three groups distributed circumferentially around the bearing surface, each group comprising at least one of the said recesses and being connected separately from the other groups through an associated restrictor or restrictors to the source of hydraulic pressure fluid.

References Cited

UNITED STATES PATENTS

| 1,117,504 | 11/1914 | Kingsbury | 308—160 |
| 1,375,697 | 4/1921 | Hirt | 308—160 |
| 3,165,365 | 1/1965 | Wiedemann | 308—170 |
| 1,682,189 | 8/1928 | Schein | 308—170 |
| 3,044,947 | 7/1962 | Payne | 176—30 |
| 3,054,741 | 9/1962 | Tatlock et al. | 176—30 |
| 3,090,741 | 5/1963 | Fawcett | 176—30 |
| 3,113,808 | 12/1963 | Carroll | 308—9 |
| 3,193,334 | 7/1965 | Porath | 308—9 |

FOREIGN PATENTS

| 331,637 | 9/1958 | Switzerland. |
| 1,010,959 | 11/1948 | France. |

MARTIN P. SCHWADRON, *Primary Examiner.*

L. DEWAYNE RUTLEDGE, *Examiner.*

F. SUSKO, *Assistant Examiner.*